United States Patent
Ando et al.

(10) Patent No.: US 10,190,195 B2
(45) Date of Patent: Jan. 29, 2019

(54) ALLOY POWDER FOR OVERLAY WELDING, AND WELD OVERLAY ALLOY MEMBER AND ENGINE VALVE OBTAINED USING THE SAME

(71) Applicant: TOYOTA JIDOSHA KABUSHIKI KAISHA, Toyota-shi, Aichi (JP)

(72) Inventors: Kimihiko Ando, Toyota (JP); Nobuyuki Shinohara, Tajimi (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 316 days.

(21) Appl. No.: 14/856,628

(22) Filed: Sep. 17, 2015

(65) Prior Publication Data

US 2016/0102387 A1     Apr. 14, 2016

(30) Foreign Application Priority Data

Oct. 9, 2014  (JP) ................. 2014-208278

(51) Int. Cl.
| | | |
|---|---|---|
| *C22C 19/07* | (2006.01) | |
| *C22C 30/00* | (2006.01) | |
| *F01L 3/02* | (2006.01) | |
| *B23K 35/30* | (2006.01) | |
| *B23K 35/02* | (2006.01) | |

(52) U.S. Cl.
CPC .......... *C22C 19/07* (2013.01); *B23K 35/0255* (2013.01); *B23K 35/30* (2013.01); *B23K 35/3046* (2013.01); *C22C 30/00* (2013.01); *F01L 3/02* (2013.01)

(58) Field of Classification Search
CPC .... B23K 35/0255; B23K 35/30; C22C 19/07; F01L 3/02
See application file for complete search history.

(56) References Cited

U.S. PATENT DOCUMENTS

| | | | | |
|---|---|---|---|---|
| 2,959,480 A | * | 11/1960 | Flint ................ | C22C 19/057 |
| | | | | 420/441 |
| 5,314,659 A | | 5/1994 | Hidaka et al. | |
| | | (Continued) | | |

FOREIGN PATENT DOCUMENTS

| | | |
|---|---|---|
| DE | 69229821 T2 | 4/2000 |
| JP | H5-84592 A | 4/1993 |
| | (Continued) | |

OTHER PUBLICATIONS

Communication dated Nov. 29, 2016 from the Japanese Patent Office in application No. 2014-208278.

(Continued)

*Primary Examiner* — Kevin A Lathers
(74) *Attorney, Agent, or Firm* — Sughrue Mion, PLLC (57) ABSTRACT

According the present invention, an alloy powder for overlay welding that prevents generation of gas defects in a weld overlay alloy in order to improve the toughness and wear resistance of the weld overlay alloy is provided. The alloy powder is an alloy powder for overlay welding on a steel surface containing nitrogen, which is characterized in that it contains 30% to 45% by mass of Mo, 10% to 30% by mass of Ni, 0.2% to 0.6% by mass of C, and 0.30% to 2.0% by mass of Al, with the balance made up of incidental impurities and Co.

4 Claims, 9 Drawing Sheets

(56) References Cited

U.S. PATENT DOCUMENTS

| | | | |
|---|---|---|---|
| 5,958,332 A * | 9/1999 | Hoeg | B23K 35/304 123/188.3 |
| 6,248,292 B1 | 6/2001 | Ando et al. | |
| 8,375,980 B2 | 2/2013 | Higashiyama et al. | |
| 2002/0168285 A1 | 11/2002 | Blake et al. | |
| 2011/0303865 A1 * | 12/2011 | Higashiyama | B23K 35/3046 251/359 |

FOREIGN PATENT DOCUMENTS

| | | |
|---|---|---|
| JP | 05131289 A | 5/1993 |
| JP | 11-310854 A | 11/1999 |
| JP | 2011-255417 A | 12/2011 |

OTHER PUBLICATIONS

Notice of Allowance dated May 9, 2017 from the Japanese Patent Office 2014-208278.

* cited by examiner

Example 2

Fig. 3B

Example 3

Fig. 3C

Example 4

Fig. 3D

Comparative Example 1

Fig. 3E

Comparative Example 2

Fig. 3F

Comparative Example 3

Fig. 4A

Comparative Example 4

Fig. 4B

Comparative Example 5

Proeutectic carbide

Fig. 4C

Comparative Example 6

Proeutectic carbide

Fig. 4D

Comparative Example 7

ALLOY POWDER FOR OVERLAY WELDING, AND WELD OVERLAY ALLOY MEMBER AND ENGINE VALVE OBTAINED USING THE SAME

BACKGROUND

Technical Field

The present invention relates to an alloy powder for overlay welding that is used for performing overlay welding on a steel surface and a weld overlay alloy member and an engine valve obtained using the same. In particular, the present invention relates to an alloy powder for overlay welding, which is preferably used in a high temperature environment, and a weld overlay alloy member and an engine valve that are obtained using the same.

Background Art

Heat-resistant steels have been conventionally used for equipment used in high temperature environments such as inlet air valves and exhaust air valves for internal combustion engines in order to improve wear resistance and the like. In particular, for example, the valve face of an engine valve is required to have properties such as wear resistance, low aggressiveness, heat resistance, and heat shock resistance within a wide temperature range, from the ordinary temperature to high temperatures.

Properties of heat-resistant steels that are generally used as valve materials are insufficient as the aforementioned properties. Therefore, the properties are imparted by melting an alloy powder for overlay welding having the above properties and performing overlay welding (build-up welding) with the molten alloy on a valve face. In particular, an alloy powder for overlay welding (build-up welding) that facilitates formation of an oxide film having excellent oxidation properties is used in an engine for which CNG is used as a fuel because the oxidization power of a combustion atmosphere is weak in such engine.

For example, as an example of such alloy powder for overlay welding, Patent Document 1 suggests an alloy powder for overlay welding containing 0.7% to 1.0% by mass of C, 30% to 40% by mass of Mo, 20% to 30% by mass of Ni, and 10% to 15% by mass of Cr, with the balance made up of incidental impurities and Co in the first embodiment.

At a weld overlay alloy portion (hereafter referred to as "weld overlay alloy") of a weld overlay alloy member obtained by overlay welding of the above alloy powder for overlay welding, eutectic carbide of Mo and Cr is formed while proeutectic carbide of Mo, which may serve as an origin of fractures, is not formed. In this case, the toughness and wear resistance of a weld overlay alloy can be improved to a greater extent than is possible with conventional weld overlay alloys.

Patent Document 1 further suggests an alloy powder for overlay welding containing 0.2% to 0.5% by mass of C, 30% to 40% by mass of Mo, and 20% to 30% by mass of Ni, with the balance made up of incidental impurities and Co, which is similar to the above alloy powder for overlay welding except that it does not contain Cr, in the second embodiment.

At a weld overlay alloy portion (also referred to as "weld overlay alloy") of a weld overlay alloy member obtained by overlay welding of the above alloy powder for overlay welding, eutectic carbide of Mo can be formed by setting the content of C to 0.2% to 0.5% by mass relative to the above contents of Mo and Ni while proeutectic carbide that may serve as an origin of fractures is not formed. In this case, the toughness and wear resistance of a weld overlay alloy can be improved to a greater extent than is possible with conventional weld overlay alloys, thereby improving heat shock resistance.

RELATED ART DOCUMENTS

Patent Documents

Patent Document 1: JP 2011-255417 A

SUMMARY

As stated above, when overlay welding is performed using the alloy powders for overlay welding in the first and second embodiments of Patent Document 1, formation of proeutectic carbide in a weld overlay alloy can be suppressed, and also, the toughness and wear resistance of a weld overlay alloy can be improved to a greater extent than is possible with conventional weld overlay alloys.

However, when overlay welding has been performed on steel such as an austenite-based heat-resistant steel containing nitrogen with the use of the alloy powder for overlay welding of the first embodiment of Patent Document 1, gas defects (blowholes) have been generated in the weld overlay alloy obtained by melting the alloy powder for overlay welding in some cases. In particular, when overlay welding was performed using the alloy powder for overlay welding containing a reduced amount of Cr (or not containing Cr) of the second embodiment, such phenomenon was obviously observed.

The present invention has been made in view of the above problems. The object of the present invention is to provide an alloy powder for overlay welding that is unlikely to cause generation of gas defects in a weld overlay alloy in order to improve the toughness and wear resistance of the weld overlay alloy.

As a result of intensive studies in order to achieve the above object, the present inventors arrived at the idea that when overlay welding is performed on steel containing nitrogen, nitrogen contained in the steel forms nitrogen gas and thus the nitrogen gas is present in a weld overlay alloy in a molten state, which causes generation of gas defects (blowholes) in the weld overlay alloy. In particular, it was thought that when an alloy powder for overlay welding does not contain Cr, nitrogen tends not to form a compound upon overlay welding because Mo is less likely to form nitride than Cr, which prevents sufficient suppression of formation of nitrogen gas. Therefore, the present inventors focused on Al as an element that would be likely to form a compound with nitrogen in such case.

The present invention has been made in view of the above. The alloy powder for overlay welding of the present invention is an alloy powder for overlay welding on a steel surface containing nitrogen, which is characterized in that it contains 30% to 45% by mass of Mo, 10% to 30% by mass of Ni, 0.2% to 0.6% by mass of C, and 0.30% to 2.0% by mass of Al, with the balance made up of incidental impurities and Co.

According to the present invention, by allowing the alloy powder for overlay welding to contain Al in the above range, it is possible to cause formation of nitride of Al and nitrogen in the steel and suppress the generation of nitrogen gas during overlay welding such that an Mo oxide film prevents loss of wear resistance of a weld overlay alloy. This makes it possible to prevent generation of gas defects in the weld overlay alloy during overlay welding.

In addition, by allowing the alloy powder for overlay welding to contain Mo in the above range, it is possible to prevent generation of proeutectic carbide and to allow formation of the above oxide film as a protective film having excellent solid lubricity on the surface of the weld overlay alloy. Accordingly, aggressiveness can be reduced and wear resistance can be improved at the same time. In addition, by allowing an alloy powder for overlay welding to contain Ni in the above range, it is possible to prevent generation of proeutectic carbide and improve the toughness of the weld overlay alloy. By allowing an alloy powder for overlay welding to contain C in the above range, it is possible to prevent the generation of proeutectic carbide and cause formation of Mo carbide, thereby improving the wear resistance of the weld overlay alloy.

In the case of a weld overlay alloy member, which is obtained by performing overlay welding on a steel containing nitrogen with the use of a weld overlay alloy formed with the above alloy powder for overlay welding in a molten state, the weld overlay alloy contains fewer gas defects and thus the weld overlay alloy has improved toughness and wear resistance.

In particular, steel containing nitrogen such as an austenite-based heat-resistant steel containing nitrogen is often used as a base material for engine valves such as inlet air valves and exhaust air valves. That is, when the above weld overlay alloy member is used for an engine valve, a valve face that comes into contact with a valve sheet of an engine valve is a surface of steel containing nitrogen. Therefore, it is preferable to perform overlay welding to obtain a weld overlay alloy by applying the above molten alloy powder for overlay welding to a valve face.

According the present invention, it is possible to prevent generation of gas defects in a weld overlay alloy in order to improve the toughness and wear resistance of the weld overlay alloy.

DETAILED DESCRIPTION OF THE EMBODIMENTS

Embodiments of the present invention are described in detail below.

1. Alloy Powder for Overlay Welding

An alloy powder for overlay welding in one embodiment of the present invention is used for overlay welding on the surface of steel containing nitrogen. The alloy powder for overlay welding used herein is in the form of an aggregate of alloy particles for overlay welding, which contains elements (in the composition described below) of alloy particles for overlay welding.

An alloy powder for overlay welding in one embodiment of the present invention contains 30% to 45% by mass of Mo, 10% to 30% by mass of Ni, 0.2% to 0.6% by mass of C, and 0.30% to 2.0% by mass of Al, with the balance made up of incidental impurities and Co.

Such hard particles can be produced by atomization treatment, including preparing a molten metal having the composition and the ratio described above, and spraying the molten metal. Alternatively, the hard particles can be obtained by powderizing a concrete obtained by solidifying a molten metal through mechanical pulverization. Atomization treatment can be gas atomization treatment or water atomization treatment.

The lower limit and the upper limit of the aforementioned composition of the alloy powder for overlay welding used herein can be appropriately changed depending on the reasons for limiting the composition described below and the degree of importance of characteristics of members to be used in view of hardness, solid lubricity, adhesiveness, cost, etc. within the scope of the composition. In addition, the content of Co that forms a substrate of a weld overlay alloy is preferably 30% to 60% by mass based on the premise that the contents of Mo, Ni, C, and Al fall within the ranges described below.

1-1. Mo: 30% to 45% by Mass

Mo in the composition of the alloy powder for overlay welding is an element intended to form an oxide film that suppresses adhesion of a weld overlay alloy to a material with which the weld overlay alloy comes into contact and to form Mo carbide while suppressing formation of proeutectic carbide so as to improve wear resistance of a weld overlay alloy.

By allowing an alloy powder for overlay welding to contain 30% to 45% by mass of Mo, it is possible to prevent generation of proeutectic carbide and to allow formation of the above oxide film as a protective film having excellent solid lubricity on the surface of the weld overlay alloy. Accordingly, aggressiveness can be reduced and wear resistance can be improved at the same time.

If the content of Mo in the alloy powder for overlay welding is less than 30% by mass, the amount of Mo carbide formed decreases and the oxidation onset temperature of hard particles increases (see, for example, Comparative Example 8 described below), which causes suppression of formation of Mo oxide in a high-temperature usage environment, followed by reduction of wear resistance of the weld overlay alloy. On the other hand, if the content of Mo exceeds 45% by mass, adhesiveness between hard particles and an iron-based substrate decreases. In addition, proeutectic carbide is formed in the weld overlay alloy (see, for example, Comparative Example 9 described below), which might result in reduction of toughness of the weld overlay alloy. Preferably, the content of Mo is 30% to 40% by mass.

1-2. Ni: 10% to 30% by Mass

Ni in the composition of the alloy powder for overlay welding is an element intended to suppress formation of proeutectic carbide in the weld overlay alloy so as to improve toughness of the weld overlay alloy. By allowing the alloy powder for overlay welding to contain 10% to 30% by mass of Ni, it is possible to suppress formation of proeutectic carbide so as to improve the toughness of the weld overlay alloy. Preferably, the content of Ni is 10% to 20% by mass.

Here, if the content of Ni in the alloy powder for overlay welding is less than 10% by mass, proeutectic carbide is formed in the weld overlay alloy, which might cause reduction of the toughness of the weld overlay alloy (see, for example, Comparative Example 10 described below). On the other hand, if the content of Ni exceeds 30% by mass, wear resistance of the weld overlay alloy might decrease (see, for example, Comparative Example 11 described below).

1-3. C: 0.2% to 0.6% by Mass

C in the composition of the alloy powder for overlay welding is an element intended to increase the hardness of the weld overlay alloy through formation of Mo carbide so as to improve the wear resistance of the weld overlay alloy. By allowing the alloy powder for overlay welding to contain 0.2% to 0.6% by mass of C, it is possible to cause formation of Mo carbide while suppressing formation of proeutectic carbide so as to improve wear resistance of the weld overlay alloy.

Here, if the content of C in the alloy powder for overlay welding is less than 0.2% by mass, the amount of Mo carbide formed in the weld overlay alloy would be insufficient, which might cause reduction of wear resistance of the weld overlay alloy (see, for example, Comparative Example 12 described below). On the other hand, if the content of C exceeds 0.6% by mass, proeutectic carbide tends to be formed in the weld overlay alloy, which might cause reduction of toughness of the weld overlay alloy (see, for example, Comparative Examples 13 and 14 described below). Preferably, the content of C is 0.3% to 0.6% by mass.

1-4. Al: 0.30% to 2.0% by Mass

Al in the composition of the alloy powder for overlay welding is more likely to form nitride with a nitrogen element than Mo. That is, Al is an element intended to suppress generation of nitrogen gas derived from nitrogen contained in steel so as to prevent generation of gas defects (blowholes) in the weld overlay alloy.

By allowing the alloy powder for overlay welding to contain 0.30% to 2.0% by mass of Al, it is possible to cause Al to form nitride with nitrogen contained in the steel upon overlay welding while preventing loss of wear resistance of the weld overlay alloy as a result of formation of Mo oxide film so as to suppress generation of nitrogen gas during overlay welding. Accordingly, it is possible to prevent generation of gas defects in the weld overlay alloy upon overlay welding.

Here, if the content of Al in the alloy powder for overlay welding is less than 0.30% by mass, the incidence of blowholes might exceed 20% (see, for example, Comparative Examples 1 and 2 described below). On the other hand, if the content of Al exceeds 2.0% by mass, an Al oxide film tends to be formed (the oxidation onset temperature increases) (see, for example, Comparative Example 7 described below). Accordingly, an Mo oxide film that suppresses adhesion wear at a valve operating temperature is less likely to be formed. Preferably, the content of Al is 0.8% to 1.6% by mass.

2. Weld Overlay Alloy Member

Steel containing nitrogen is used as steel (base material) for overlay welding for manufacturing weld overlay alloy members. Such manufacturing comprises melting the above alloy powder for overlay welding by plasma overlay welding or the like to perform overlay welding on the surface of the steel with the use of the alloy powder for overlay welding in a molten state. Examples of the steel include austenite-based heat-resistant steels containing nitrogen (JIS standards: SUH35, SUH36, SUH37, SUH661, etc.).

As stated above, in a case in which the alloy powder for overlay welding is used for overlay welding on the surface of such steel, few blowholes are generated in the weld overlay alloy. In particular, in a case in which the steel contains 0.2% by mass or more of nitrogen, the alloy powder for overlay welding is more effective for reducing generation of blowholes in the weld overlay alloy. In addition, since no proeutectic carbide is formed in the weld overlay alloy, the carbide size decreases and thus distortion of the carbide interface is reduced. Accordingly, a weld overlay alloy having excellent toughness in which cracks are unlikely to be formed can be obtained. In addition, since the upper limit of the amount of Al contained in the alloy powder for overlay welding is limited in embodiments of the present invention, an Mo oxide film having solid lubricity is formed on the surface of the weld overlay alloy, making it possible to reduce adhesion wear of the weld overlay alloy.

A wear-resistant iron-based sintered alloy obtained by the production method described above has mechanical strength and wear resistance superior to those of conventional alloys in a high-temperature usage environment. For example, it can be preferably used for an engine valve for an engine using, as a fuel, a compressed natural gas or a liquefied petroleum gas and a west gate valve of a turbocharger in a high-temperature usage environment. When the wear-resistant iron-based sintered alloy is applied to an engine valve, the alloy powder for overlay welding is overlaid by welding on a valve face that comes into contact with a valve sheet.

EXAMPLES

Specific examples of the present invention are described below with comparative examples.

Example 1

First, an alloy powder for overlay welding containing 30% to 45% by mass of Mo, 10% to 30% by mass of Ni, 0.2% to 0.6% by mass of C, and 0.30% to 2.0% by mass of Al, with the balance made up of incidental impurities and Co, was produced in the Examples of the present invention.

Specifically, in Example 1, an alloy powder for overlay welding was produced by melting an alloy for overlay welding having a composition consisting of 30% by mass of Mo, 10% by mass of Ni, 0.3% by mass of C, and 0.4% by mass of Al, with the balance made up of incidental impurities and Co (alloy having a substrate comprising Co) at 1700° C. or higher and performing gas atomization using an inert gas. Particles of the alloy powder for overlay welding were classified within the range of 44-180 μm. As a result, an alloy powder for overlay welding (Co-30Mo-10Ni-0.3C-0.4Al) was obtained.

Next, the alloy powder for overlay welding was heated to 1700° C. or higher by plasma welding performed at an output of 100 A and a processing rate of 5 mm/sec to melt the alloy powder. Overlay welding (build-up welding) was performed using the molten alloy powder for overlay welding to form a weld overlay alloy on a valve face of an engine valve made of austenite-based heat-resistant steel (JIS SUH35). As a result, an engine valve (weld overlay alloy member) having a valve face on which a weld overlay alloy was formed was obtained. Further, test samples (weld overlay alloy members) each having a composition similar to the above composition were produced for a variety of tests described below.

Example 2

As in the case of Example 1, an engine valve having a valve face processed by overlay welding (build-up welding) and test samples were obtained. Example 2 differs from Example 1 in that the content of Al in the alloy powder for overlay welding was set to 0.8% by mass as shown in Table 1 below. Specifically, the alloy powder for overlay welding of Example 2 is a powder having a composition of Co-30Mo-10Ni-0.3C-0.8Al.

Example 3

As in the case of Example 1, an engine valve having a valve face processed by overlay welding (build-up welding) and test samples were obtained. Example 3 differs from Example 1 in that the content of Al in the alloy powder for overlay welding was set to 1.6% by mass as shown in Table 1. Specifically, the alloy powder for overlay welding of Example 3 is a powder having a composition of Co-30Mo-10Ni-0.3C-1.6Al.

Example 4

As in the case of Example 1, an engine valve having a valve face processed by overlay welding (build-up welding) and test samples were obtained. Example 4 differs from Example 1 in that the content of Mo in the alloy powder for overlay welding was set to 40% by mass, the content of Ni in the same was set to 20% by mass, and the content of Al in the same was set to 1.6% by mass as shown in Table 1. Specifically, the alloy powder for overlay welding of Example 4 is a powder having a composition of Co-40Mo-20Ni-0.3C-1.6Al.

Example 5

As in the case of Example 1, an engine valve having a valve face processed by overlay welding (build-up welding) and test samples were obtained. Example 5 differs from Example 1 in that the content of Mo in the alloy powder for overlay welding was set to 40% by mass, the content of Ni in the same was set to 20% by mass, the content of C in the same was set to 0.6% by mass, and the content of Al in the same was set to 0.8% by mass as shown in Table 1. Specifically, the alloy powder for overlay welding of Example 5 is a powder having a composition of Co-40Mo-20Ni-0.6C-0.8Al.

Comparative Example 1

As in the case of Example 1, an engine valve having a valve face processed by overlay welding (build-up welding) and test samples were obtained. Comparative example 1 differs from Example 1 in that the alloy powder for overlay welding did not contain Al as shown in Table 1. Specifically, the alloy powder for overlay welding of Comparative Example 1 is a powder having a composition of Co-30Mo-10Ni-0.3C.

Comparative Example 2

As in the case of Example 1, an engine valve having a valve face processed by overlay welding (build-up welding) and test samples were obtained. Comparative Example 2 differs from Example 1 in that the content of Mo in the alloy powder for overlay welding was set to 40% by mass, the content of Ni in the same was set to 20% by mass, and the alloy powder for overlay welding did not contain Al as shown in Table 1. Specifically, the alloy powder for overlay welding of Comparative Example 2 is a powder having a composition of Co-40Mo-20Ni-0.3C.

Comparative Example 3

As in the case of Example 1, an engine valve having a valve face processed by overlay welding (build-up welding) and test samples were obtained. Comparative Example 3 differs from Example 1 in that the alloy powder for overlay welding did not contain Al while it further contained 2% by mass of Nb as shown in Table 1. Specifically, the alloy powder for overlay welding of Comparative Example 3 is a powder having a composition of Co-30Mo-10Ni-0.3C-2Nb.

Comparative Example 4

As in the case of Example 1, an engine valve having a valve face processed by overlay welding (build-up welding) and test samples were obtained. Comparative Example 4 differs from Example 1 in that the alloy powder for overlay welding did not contain Al while it further contained 1.4% by mass of Ti as shown in Table 1. Specifically, the alloy powder for overlay welding of Comparative Example 4 is a powder having a composition of Co-30Mo-10Ni-0.3C-1.4Ti.

Comparative Example 5

As in the case of Example 1, an engine valve having a valve face processed by overlay welding (build-up welding) and test samples were obtained. Comparative Example 5 differs from Example 1 in that the content of Mo in the alloy powder for overlay welding was set to 38% by mass, the content of Ni in the same was set to 20% by mass, and the alloy powder for overlay welding did not contain Al while it further contained 5% by mass of Mn and 2% by mass of Nb as shown in Table 1. Specifically, the alloy powder for overlay welding of Comparative Example 5 is a powder having a composition of Co-38Mo-20Ni-0.3C-5Mn-2Nb.

Comparative Example 6

As in the case of Example 1, an engine valve having a valve face processed by overlay welding (build-up welding) and test samples were obtained. Comparative Example 6 differs from Example 1 in that the content of Mo in the alloy powder for overlay welding was set to 31% by mass, the content of C in the same was set to 0.8% by mass, and the alloy powder for overlay welding did not contain Al while it further contained 13% by mass of Fe, 6% by mass of Mn, 4% by mass of Cr, 0.8% by mass of Si as shown in Table 1. Specifically, the alloy powder for overlay welding of Comparative Example 6 is a powder having a composition of Co-31Mo-10Ni-0.8C-13Fe-6Mn-4Cr-0.8Si.

Comparative Example 7

As in the case of Example 1, an engine valve having a valve face processed by overlay welding (build-up welding) and test samples were obtained. Comparative Example 7 differs from Example 1 in that the content of Al in the alloy powder for overlay welding was set to 2.4% by mass as shown in Table 1. Specifically, the alloy powder for overlay welding of Comparative Example 7 is a powder having a composition of Co-30Mo-10Ni-0.3C-2.4Al.

Comparative Example 8

As in the case of Example 1, an engine valve having a valve face processed by overlay welding (build-up welding) and test samples were obtained. Comparative Example 8 differs from Example 1 in that the content of Mo in the alloy powder for overlay welding was set to 25% by mass, the content of Ni in the same was set to 20% by mass, and the alloy powder for overlay welding did not contain Al as shown in Table 1. Specifically, the alloy powder for overlay welding of Comparative Example 8 is a powder having a composition of Co-25Mo-20Ni-0.3C.

Comparative Example 9

As in the case of Example 1, an engine valve having a valve face processed by overlay welding (build-up welding) and test samples were obtained. Comparative Example 9 differs from Example 1 in that the content of Mo in the alloy powder for overlay welding was set to 50% by mass, the content of Ni in the same was set to 20% by mass, and the alloy powder for overlay welding did not contain Al as shown in Table 1. Specifically, the alloy powder for overlay welding of Comparative Example 9 is a powder having a composition of Co-50Mo-20Ni-0.3C.

Comparative Example 10

As in the case of Example 1, an engine valve having a valve face processed by overlay welding (build-up welding) and test samples were obtained. Comparative Example 10 differs from Example 1 in that the content of Mo in the alloy powder for overlay welding was set to 40% by mass, the content of Ni in the same was set to 5% by mass, and the alloy powder for overlay welding did not contain Al as shown in Table 1. Specifically, the alloy powder for overlay welding of Comparative Example 10 is a powder having a composition of Co-40Mo-5Ni-0.3C.

Comparative Example 11

As in the case of Example 1, an engine valve having a valve face processed by overlay welding (build-up welding) and test samples were obtained. Comparative Example 11 differs from Example 1 in that the content of Mo in the alloy powder for overlay welding was set to 40% by mass, the content of Ni in the same was set to 35% by mass, and the alloy powder for overlay welding did not contain Al as shown in Table 1. Specifically, the alloy powder for overlay welding of Comparative Example 11 is a powder having a composition of Co-40Mo-35Ni-0.3C.

Comparative Example 12

As in the case of Example 1, an engine valve having a valve face processed by overlay welding (build-up welding) and test samples were obtained. Comparative Example 12 differs from Example 1 in that the content of Mo in the alloy powder for overlay welding was set to 40% by mass, the content of Ni in the same was set to 20% by mass, and the alloy powder for overlay welding did not contain C and Al as shown in Table 1. Specifically, the alloy powder for overlay welding of Comparative Example 12 is a powder having a composition of Co-40Mo-20Ni.

Comparative Example 13

As in the case of Example 1, an engine valve having a valve face processed by overlay welding (build-up welding) and test samples were obtained. Comparative Example 13 differs from Example 1 in that the content of Mo in the alloy powder for overlay welding was set to 40% by mass, the content of C in the same was set to 1.0% by mass, and the alloy powder for overlay welding did not contain Al as shown in Table 1. Specifically, the alloy powder for overlay welding of Comparative Example 13 is a powder having a composition of Co-40Mo-10Ni-1.0C.

Comparative Example 14

As in the case of Example 1, an engine valve having a valve face processed by overlay welding (build-up welding) and test samples were obtained. Comparative Example 14 differs from Example 1 in that the content of Mo in the alloy powder for overlay welding was set to 40% by mass, the content of Ni in the same was set to 20% by mass, the content of C in the same was set to 1.5% by mass, and the alloy powder for overlay welding did not contain Al as shown in Table 1. Specifically, the alloy powder for overlay welding of Comparative Example 14 is a powder having a composition of Co-40Mo-20Ni-1.5C.

<Test for Determining the Incidence of Blowholes>

A plurality of weld overlay alloys formed by overlay welding of the alloy powders for overlay welding of Examples 1-4 and Comparative Examples 1-7 were cut to obtain cross-sections. Each cross-section of each weld overlay alloy was magnified 100 times using an optical microscope for determination of the incidence of blowholes generated in the weld overlay alloy. The results are shown in Table 1 below and FIG. 1.

Figure 1:
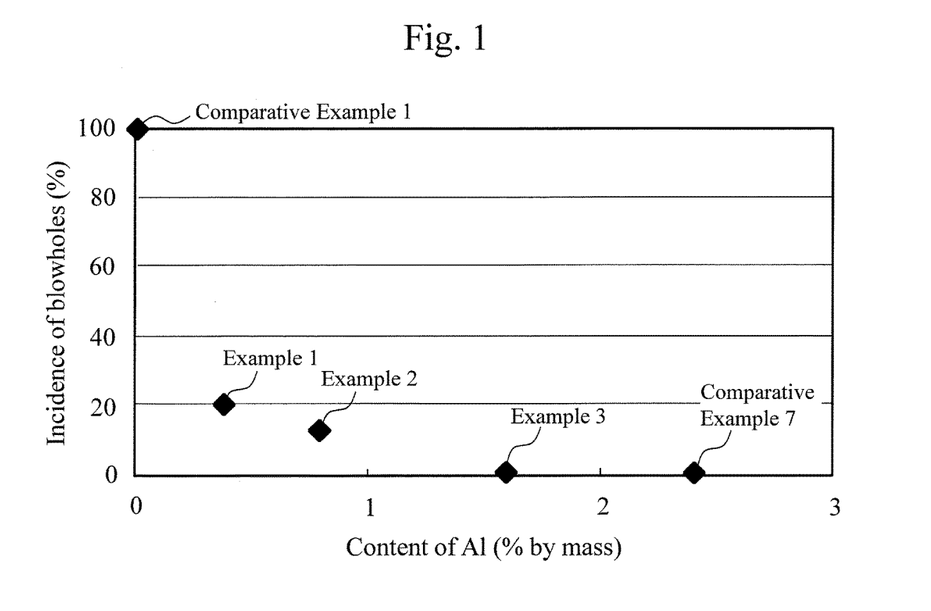
FIG. 1 shows the relationship between the content of Al and the incidence of blowholes for alloy powders for overlay welding obtained in Examples 1-3 and Comparative Examples 1 and 7.
Figure 2:
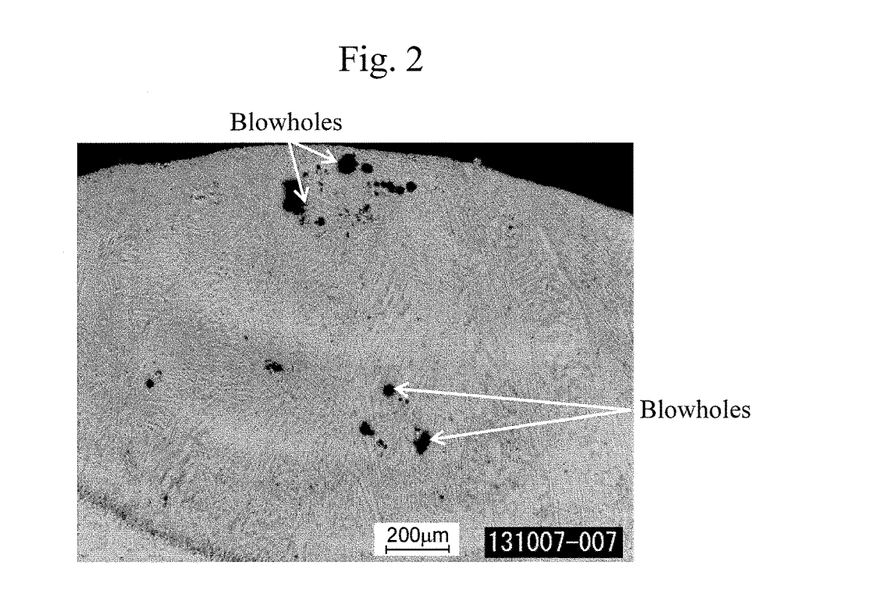
FIG. 2 shows an enlarged image of a cross-section of a weld overlay alloy obtained in Comparative Example 1.

In Table 1, the number shown in each pair of parentheses in the column for the incidence of blowholes represents "the number of weld overlay alloys in which blowholes were generated/the number of weld overlay alloys that were processed by overlay welding." FIG. 1 shows the relationship between the content of Al and the incidence of blowholes for the alloy powders for overlay welding obtained in Examples 1-3 and Comparative Examples 1 and 7. In addition, FIG. 2 shows an enlarged image of a cross-section of the weld overlay alloy obtained in Comparative Example 1.

<Texture Observation (Test for Confirming the Presence or Absence of Proeutectic Carbide)>

The weld overlay alloys formed by overlay welding of the alloy powders for overlay welding of Examples 1-5 and Comparative Examples 1-14 were cut to obtain cross-sections. The texture of each cross-section was observed to confirm whether or not proeutectic carbide had been formed in the corresponding weld overlay alloy. The results are shown in Table 1. In addition, FIGS. 3A to 3F show cross-sectional images of the weld overlay alloys obtained in Examples 2-4 and Comparative Examples 1-3. FIGS. 4A to 4D show cross-sectional images of the weld overlay alloys obtained in Comparative Examples 4-7.

<Charpy Impact Test (Test for Determining the Impact Value)>

The weld overlay alloys formed by overlay welding of the alloy powders for overlay welding of Examples 1-4 and Comparative Examples 2, 3, 5, 6, 13, and 14 were cut to obtain cross-sections. A test piece (JIS Z 2242: no. 3 test piece) was prepared from each cross-section such that a notch was not formed on the test piece and the cross-section size was changed to 10×5 mm. A Charpy impact test was conducted to determine the impact value (J/cm$^2$) for each test piece. The results are shown in Table 1.

<Hardness Test>

The weld overlay alloys formed by overlay welding of the alloy powders for overlay welding of Examples 1-4, Comparative Examples 1-7, and Comparative Examples 11-14 were cut to obtain cross-sections. The hardness of each weld overlay alloy was measured by a hardness meter in accordance with JIS Z 2244. The results are shown in Table 1.

<Test for Measuring the Oxidation Onset Temperature>

Figure 5:
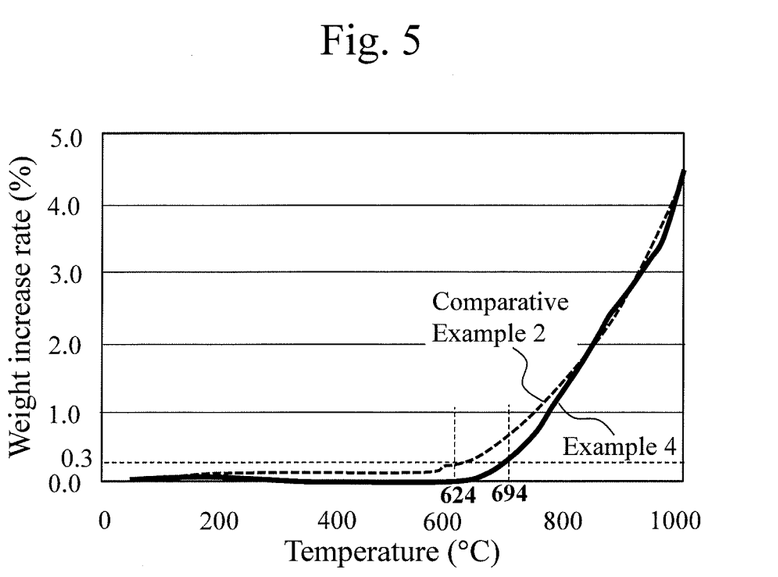
FIG. 5 shows the relationship between the heating temperature and the weight increase rate in a test for measuring the oxidation onset temperature for alloy powders for overlay welding obtained in Example 4 and Comparative Example 2.

The alloy powders for overlay welding that were prepared in Example 4 and Comparative Examples 2, 6-8, 13, and 14 were used in this test. Each alloy powder for overlay welding was oxidized by heating in the air to determine the temperature at which the weight of the alloy powder started to suddenly increase as a result of oxidization. Such temperature was designated as the oxidation onset temperature. The results are shown in Table 1 and FIG. 5. FIG. 5 shows the relationship between the heating temperature and the weight increase rate in the test for measuring the oxidation onset temperature for the alloy powders for overlay welding obtained in Example 4 and Comparative Example 2.

<Wear Test>

Figure 6:
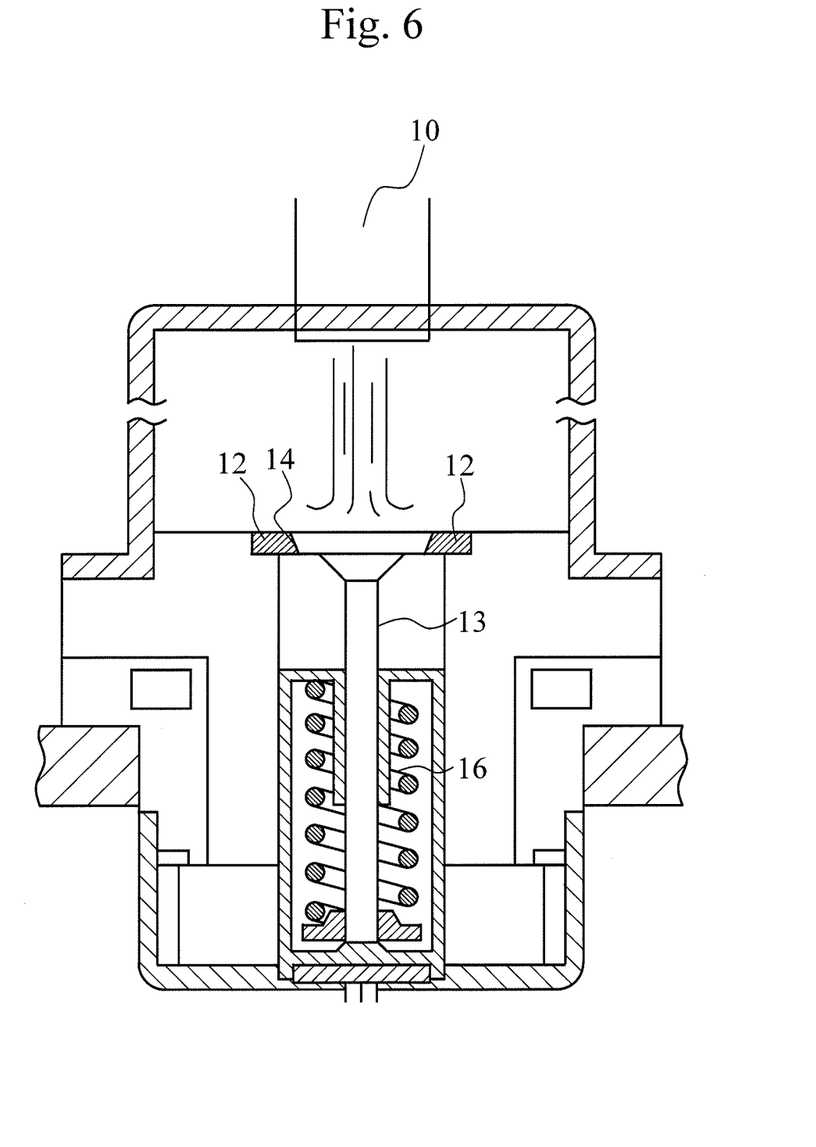
FIG. 6 schematically shows a conceptual diagram of a wear tester.

FIG. 6 schematically shows a conceptual diagram of a wear tester. Engine valves 13 were subjected to overlay welding of the alloy powders for overlay welding of Examples 3 and 4 and Comparative Examples 2, 6, 11, and 12. Aggressiveness and wear resistance of a weld overlay alloy portion of each engine valve 13 were examined using the wear tester. Specifically, a propane gas burner 10 was used as a heat source, and a propane gas combustion atmosphere was created at a sliding face between a valve face 14 obtained by overlay welding in the above manner and a valve sheet 12 made of an Fe-based sintered material.

Figure 7:
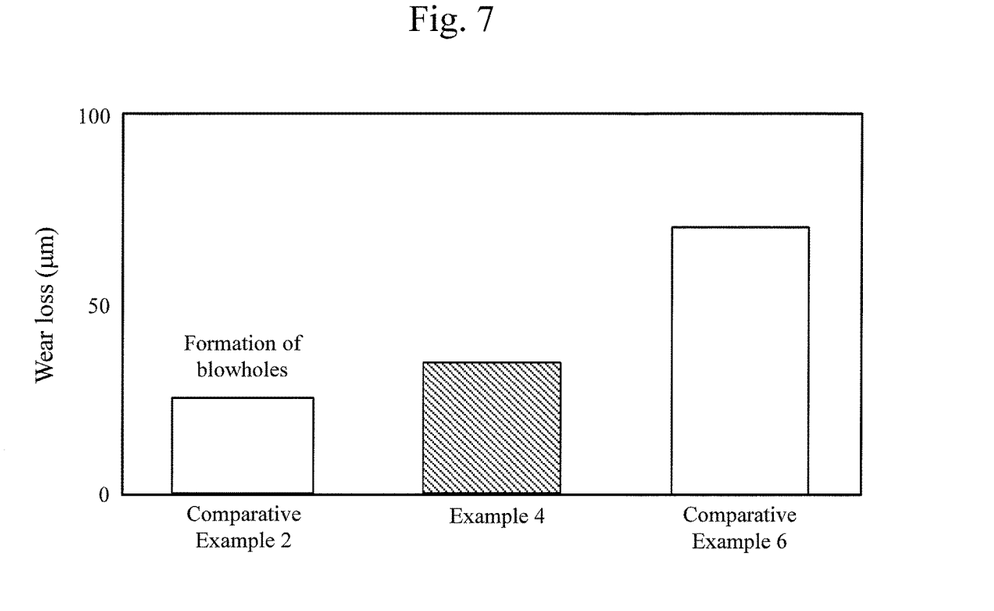
FIG. 7 shows wear loss results for engine valves obtained in Example 4 and Comparative Examples 2 and 6.

The wear test was performed in the following manner for eight hours. The temperature of the valve sheet 12 was controlled to 300° C. A load of 18 kgf was applied via a spring 16 when the valve face 14 and the valve sheet 12 came into contact with each other. The valve sheet 12 and the valve face 14 were allowed to come into contact with each other at a frequency of 2000 times/minute. In the wear test, the sinking amount corresponding to the displacement of a valve from a reference position was measured. The sinking amount of a valve indicates wear loss (wear depth) resulting from wear to the engine valve 13 and the valve sheet 12 due to contact therebetween. FIG. 7 shows wear loss results for the engine valves obtained in Example 4 and Comparative Examples 2 and 6.

TABLE 1

| | (Unit: % by mass) | | | | | | | | | | Incidence of | Presence or absence | Impact value | Hardness | Oxidation onset temperature | Wear loss |
|---|---|---|---|---|---|---|---|---|---|---|---|---|---|---|---|---|
| | Mo | Ni | C | Al | Fe | Mn | Cr | Si | Nb | Ti | Co | blowholes | of proeutectic carbide | (J/cm$^2$) | HV | (° C.) | (μm) |
| Example 1 | 30 | 10 | 0.3 | 0.4 | | | | | | | Balance | 20% (3/15) | Absent | 11.5 | 570 | | |
| Example 2 | 30 | 10 | 0.3 | 0.8 | | | | | | | Balance | 13% (2/15) | Absent | 11.5 | 526 | | |
| Example 3 | 30 | 10 | 0.3 | 1.6 | | | | | | | Balance | 0% (0/14) | Absent | 11.0 | 636 | | 50 |
| Example 4 | 40 | 20 | 0.3 | 1.6 | | | | | | | Balance | 0% (0/10) | Absent | 10.0 | 726 | 690 | 35 |
| Example 5 | 40 | 20 | 0.6 | 0.8 | | | | | | | Balance | | Absent | | | | |
| Comparative Example 1 | 30 | 10 | 0.3 | | | | | | | | Balance | 100% (12/12) | Absent | | 598 | | |
| Comparative Example 2 | 40 | 20 | 0.3 | | | | | | | | Balance | 100% (10/10) | Absent | 10.3 | 666 | 624 | 26 |
| Comparative Example 3 | 30 | 10 | 0.3 | | | | | 2 | | | Balance | 100% (10/10) | Absent | 9.3 | 641 | | |
| Comparative Example 4 | 30 | 10 | 0.3 | | | | | | | 1.4 | Balance | 27% (4/13) | Absent | | 478 | | |
| Comparative Example 5 | 38 | 20 | 0.3 | | | 5 | | 2 | | | Balance | 0% (0/10) | Present | 3.5 | 687 | | |
| Comparative Example 6 | 31 | 10 | 0.8 | | 13 | 6 | 4 | 0.8 | | | Balance | 0% (0/10) | Present | 5.0 | 468 | 660 | 71 |
| Comparative Example 7 | 30 | 10 | 0.3 | 2.4 | | | | | | | Balance | 0% (0/9) | Absent | | 623 | 730 | |
| Comparative Example 8 | 25 | 20 | 0.3 | | | | | | | | Balance | | Absent | | | 750 | |
| Comparative Example 9 | 50 | 20 | 0.3 | | | | | | | | Balance | | Present | | | | |
| Comparative Example 10 | 40 | 5 | 0.3 | | | | | | | | Balance | | Present | | | | |
| Comparative Example 11 | 40 | 35 | 0.3 | | | | | | | | Balance | | Absent | | 520 | | 75 |
| Comparative Example 12 | 40 | 20 | | | | | | | | | Balance | | Absent | | 580 | | 65 |
| Comparative Example 13 | 40 | 10 | 1.0 | | | | | | | | Balance | | Present | 3.3 | 679 | 611 | |
| Comparative Example 14 | 40 | 20 | 1.5 | | | | | | | | Balance | | Present | 3.7 | 620 | 583 | |

(Result 1: Appropriate Content of Al)

As shown in Table 1 and FIG. 1, the results of the incidence of blowholes for the weld overlay alloys of Examples 1-4 were lower than those of Comparative Examples 1-4. This is thought to be because the alloy powders for overlay welding of Examples 1-4 contained 0.3% to 2.0% by mass of Al, which is within the scope of the present invention. In particular, when the content of Al falls within the ranges of Examples 1-4 (0.4% to 1.6% by mass), the aforementioned effects are further enhanced.

It is considered that the above results were obtained because when overlay welding was conducted using the alloy powders for overlay welding of Examples 1-4, nitrogen contained in a base material for overlay welding reacted with Al contained in the alloy powder for overlay welding, and thus aluminum nitride was formed, which resulted in the generation of nitrogen gas upon overlay welding.

More specifically, among elements that constitute an alloy powder for overlay welding, Mo and Al are elements that tend to form nitride. Al has free energy that causes formation of nitride, which is greater than that of Mo in an alloy powder for overlay welding. It is therefore considered that Al facilitated the formation of nitride with nitrogen derived from the base material upon overlay welding, which could prevent the generation of blowholes (generation of nitrogen gas) in Examples 1-4, compared with Comparative Examples 1-4.

Meanwhile, it is considered that when overlay welding was performed using the alloy powders for overlay welding of Comparative Examples 1-4, nitrogen derived from a base material for overlay welding formed nitrogen gas in a weld overlay alloy in a molten state, which resulted in the generation of blowholes (gas defects) in the weld overlay alloy.

Even if Nb having free energy that causes formation of nitride at a level greater than that of Mo is added to an alloy powder for overlay welding as described in Comparative Example 3, the free energy of Al is still greater than that of Nb, and therefore nitrogen gas could be generated upon overlay welding. As a result, it would be substantially impossible to suppress the generation of blowholes in a weld overlay alloy even with the addition of Nb to the alloy powder for overlay welding.

Here, the addition of Ti to an alloy powder for overlay welding as described in Comparative Example 4 could cause slight reduction of generated nitrogen gas upon overlay welding, compared with the case of the addition of Nb. However, as is apparent from the fact that the hardness of the weld overlay alloy of Comparative Example 4 was lower than that of any of the weld overlay alloys of Examples 1-4, the addition of Ti to an alloy powder for overlay welding may cause a decrease in the hardness of a weld overlay alloy. It is therefore considered that the weld overlay alloy of Comparative Example 4 tends to have lower wear resistance than any of the weld overlay alloys of Examples 1-4.

Figure 3A:
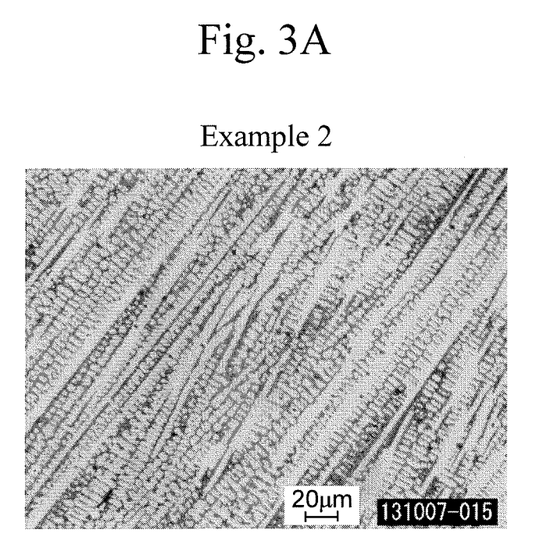
FIG. 3A shows cross-sectional image of weld overlay alloy obtained in Example 2.
Figure 3B:
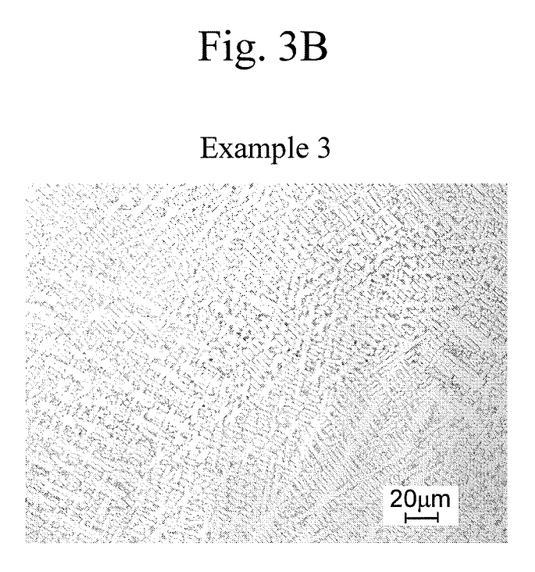
FIG. 3B shows cross-sectional image of weld overlay alloy obtained in Example 3.
Figure 3C:
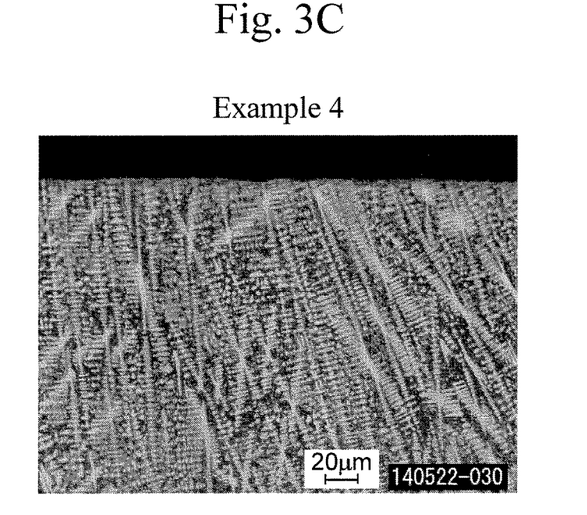
FIG. 3C shows cross-sectional image of weld overlay alloy obtained in Example 4.
Figure 3D:
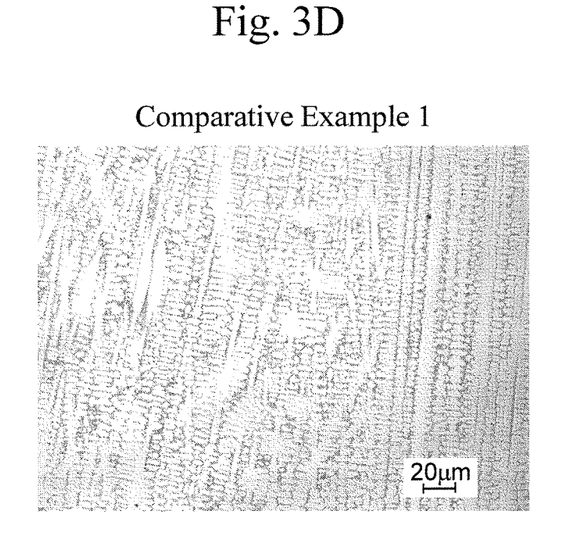
FIG. 3D shows cross-sectional image of weld overlay alloy obtained in Comparative Example 1.
Figure 3E:
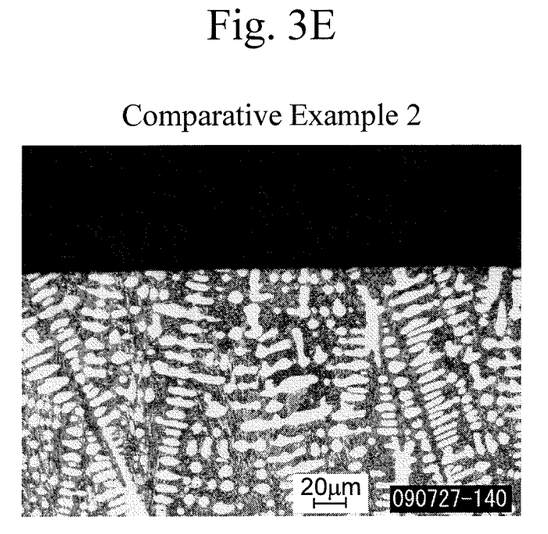
FIG. 3E shows cross-sectional image of weld overlay alloy obtained in Comparative Example 2.
Figure 3F:
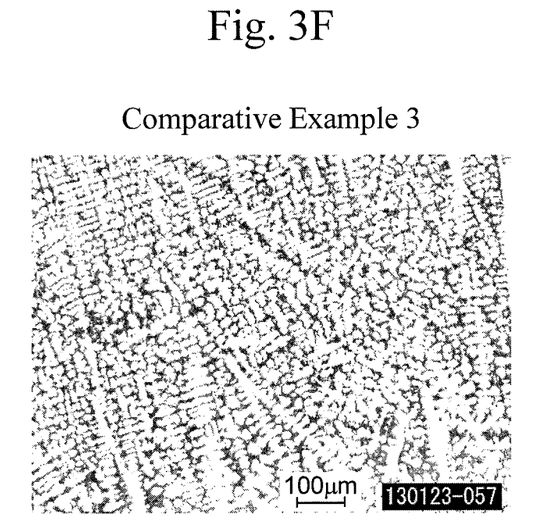
FIG. 3F shows cross-sectional image of weld overlay alloy obtained in Comparative Example 3.
Figure 4A:
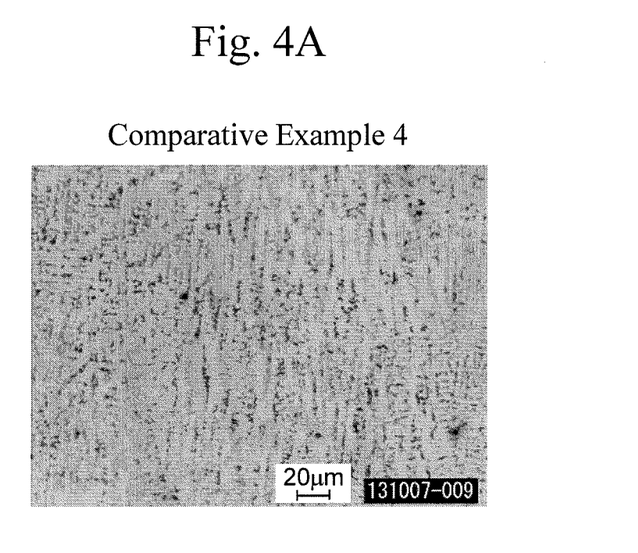
FIG. 4A shows cross-sectional image of weld overlay alloy obtained in Comparative Example 4.
Figure 4B:
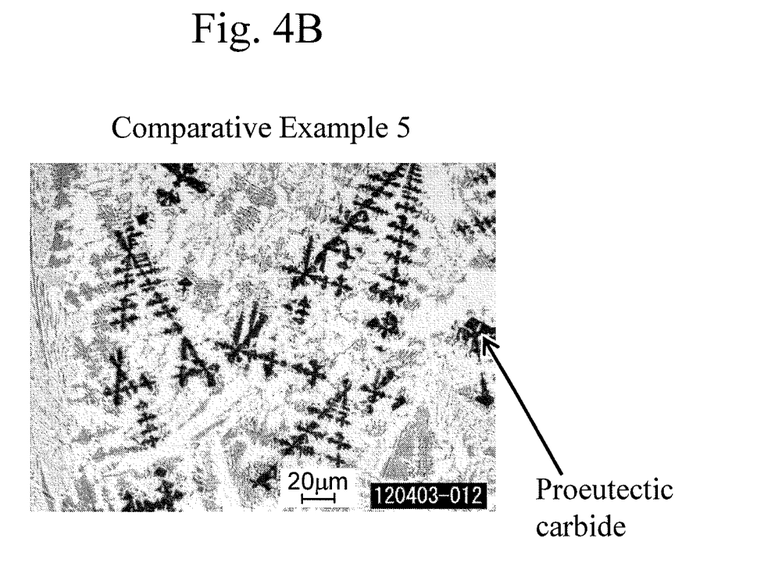
FIG. 4B shows cross-sectional image of weld overlay alloy obtained in Comparative Example 5.
Figure 4C:
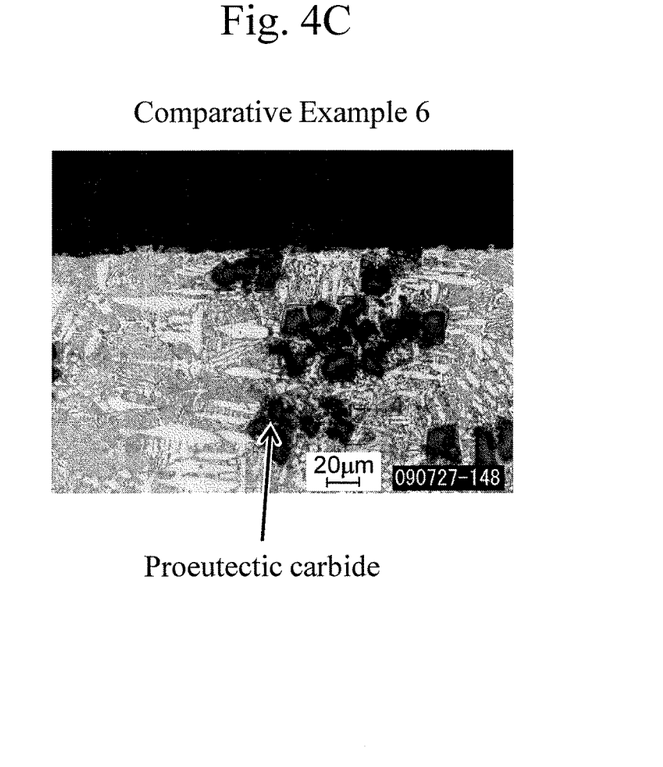
FIG. 4C shows cross-sectional image of weld overlay alloy obtained in Comparative Example 6.
Figure 4D:
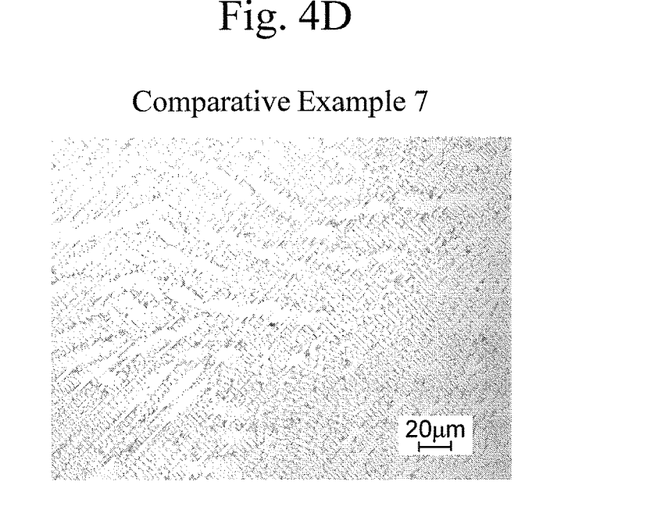
FIG. 4D shows cross-sectional image of weld overlay alloy obtained in Comparative Example 7.

Further, if the content of Mo is increased to a level greater than that in Comparative Example 3 and Mn is further added to an alloy powder for overlay welding as described in Comparative Example 5, the production of Mo nitride increases. Since Mn is more likely to cause formation of a solid solution of nitrogen than Co and Ni, generation of nitrogen gas upon overlay welding can be suppressed. In this case, however, the addition of Mn to an alloy powder for overlay welding results in formation of proeutectic carbide in a weld overlay alloy as shown in FIG. 4B. Accordingly, as shown in FIGS. 3A to 3C, the impact value of the weld overlay alloy of Comparative Example 5 is obviously lower than the impact values of Examples 2-4, in which the weld overlay alloy does not contain proeutectic carbide, and Examples 1 and 5 shown in Table 1 (reduction of toughness).

Meanwhile, if Cr is added to an alloy powder for overlay welding as described in Comparative Example 6, Cr nitride is likely to be formed upon overlay welding. However, also in this case, Mn is added to an alloy powder for overlay welding as described in Comparative Example 5, and therefore proeutectic carbide is formed in a weld overlay alloy (see FIG. 4C), which causes reduction of toughness of the weld overlay alloy. In particular, the hardness of the weld overlay alloy of Comparative Example 6 is lower than that of Example 4, as shown in Table 1. It is therefore considered that the wear loss in Comparative Example 6 was greater than that in Example, 4 as shown in FIG. 7.

As shown in FIG. 5, the oxidation onset temperature of the alloy powder for overlay welding of Example 4 was higher than that of the alloy powder for overlay welding of Comparative Example 2. This was probably due to formation of a protective film of aluminum oxide ($Al_2O_3$) on the surfaces of particles of the alloy powder for overlay welding because the alloy powder for overlay welding of Example 4 further contained Al. It is therefore presumed that if Al is added to an alloy powder for overlay welding, aluminum oxide would be formed on the surface of the weld overlay alloy obtained by overlay welding, thereby preventing molybdenum oxide ($MoO_2$), which is effective against adhesion wear, from being formed on the surface of the weld overlay alloy. In particular, if the content of Al in an alloy powder for overlay welding is excessively increased as in the case of the alloy powder for overlay welding of Comparative Example 7, the oxidation onset temperature increases. As a result, the above phenomenon is more likely to be observed.

(Result 2: Appropriate Content of Mo)

As shown in Table 1, the alloy powder for overlay welding of Comparative Example 8 differs from the alloy powders for overlay welding of Examples 1-5 in that the content of Mo was less than 30% by mass (specifically 25% by mass), which probably caused an increase in the oxidation onset temperature in Comparative Example 8. Accordingly, it is thought that molybdenum oxide ($MoO_2$), which is effective against adhesion wear, is unlikely to be formed on the surface of the weld overlay alloy obtained by overlay welding of the alloy powder for overlay welding of Comparative Example 8.

Meanwhile, as shown in Table 1, the alloy powder for overlay welding of Comparative Example 9 differs from the alloy powders for overlay welding of Examples 1-5 in that the content of Mo exceeded 45% by mass (specifically 50% by mass), which resulted in formation of proeutectic carbide of Mo. Accordingly, it is thought that the toughness of the weld overlay alloy of Comparative Example 9 is lower than that in Examples 1-5.

Based on the above, it is considered that since the alloy powders for overlay welding of Examples 1-5 contained 30% to 45% mass of Mo, which is within the scope of the present invention, the resistance to adhesion wear and toughness of the weld overlay alloy can be ensured, and thus the aforementioned effects can be further enhanced with the addition of Mo to an alloy powder for overlay welding within the ranges in Examples 1-5 (30% to 40% by mass).

(Result 3: Appropriate Content of Ni)

As shown in Table 1, the alloy powder for overlay welding of Comparative Example 10 differs from the alloy powders for overlay welding in Examples 1-5 in that the content of Ni was less than 10% by mass (specifically 5% by mass). In such case, it is considered that the effect of Ni for suppressing formation of proeutectic carbide cannot be sufficiently obtained. For this reason, it is thought that proeutectic carbide was formed in the weld overlay alloy of Comparative Example 10, which resulted in lower toughness than in any of Examples 1-5.

As shown in Table 1, the alloy powder for overlay welding of Comparative Example 11 differs from the alloy powders for overlay welding of Examples 1-5 in that the content of Ni exceeded 30% by mass (and specifically 35% by mass). As a result, hardness decreased due to reduction of carbide (see, for example, hardness in Comparative Example 2 and that in Comparative Example 11 in Table 1). It is therefore considered that wear is more likely to occur in Comparative Example 11 than in Examples 1-5 (see, e.g., wear loss results for Examples 3 and 4 and Comparative Example 11 in Table 1).

Based on the above, since the alloy powders for overlay welding of Examples 1-5 contained 10% to 30% by mass of Ni within the scope of the present invention, the wear resistance and toughness of a weld overlay alloy can be ensured and thus the aforementioned effects can be further enhanced with the addition of Ni to an alloy powder for overlay welding within the ranges in Examples 1-5 (10% to 20% by mass).

(Result 4: Appropriate Content of C)

As shown in Table 1, the alloy powder for overlay welding of Comparative Example 12 differs from the alloy powders for overlay welding of Examples 1-5 in that the content of C was less than 0.2% by mass (and specifically, carbon was not contained). It is therefore considered that formation of Mo carbide in the alloy powder for overlay welding of Comparative Example 12 is insufficient, and wear is more likely to occur in Comparative Example 12 than in Examples 1-5 (see, for example, wear loss results for Examples 3 and 4 and Comparative Example 12 in Table 1).

Meanwhile, as shown in Table 1, the alloy powders for overlay welding of Comparative Examples 13 and 14 differ from the alloy powders for overlay welding of Examples 1-5 in that the content of C exceeded 0.6% by mass (specifically 1.0% by mass in Comparative Example 13 and 1.5% by mass in Comparative Example 14). For this reason, it is thought that proeutectic carbide was formed in the weld overlay alloys of Comparative Examples 13 and 14 and therefore toughness in Comparative Examples 13 and 14 was lower than that in Examples 1-5 (see, for example, impact values for Examples 1-4 and Comparative Examples 13 and 14 in Table 1).

Based on the above, since the alloy powders for overlay welding in Examples 1-5 contained 0.2% to 0.6% by mass of C within the scope of the present invention, the wear resistance and toughness of a weld overlay alloy can be ensured and thus the aforementioned effects can be further enhanced with the addition of C to an alloy powder for overlay welding within the ranges in Examples 1-5 (0.3% to 0.6% by mass).

Embodiments of the present invention are described in detail above. The present invention, however, is not limited to the embodiments and therefore various changes and modifications may be made in the invention without departing from the spirit of the invention specified in the attached claims.

What is claimed is:

1. An alloy powder for overlay welding, which is used for performing overlay welding on a surface of steel containing nitrogen, wherein
the alloy powder consists of 30% to 45% by mass of Mo, 10% to 20% by mass of Ni, 0.2% to 0.6% by mass of C, and greater than 1.0% to 2.0% by mass of Al, with the balance made up of incidental impurities and Co.

2. A weld overlay alloy member, which is formed by melting the alloy powder for overlay welding according to claim 1 and performing overlay welding with the alloy powder to form a weld overlay alloy on the steel.

3. An engine valve, which is the weld overlay alloy member according to claim 2, wherein
the surface of steel containing nitrogen has a valve face that comes into contact with a valve sheet, and
the weld overlay alloy is formed on the valve face by overlay welding.

4. An engine valve, which is the weld overlay alloy member according to claim 1, wherein the Co is in the range of 30% to 60% by mass.

* * * * *